United States Patent [19]

Kleiner et al.

[11] 3,714,009

[45] Jan. 30, 1973

[54] PROCESS FOR THE PREPARATION OF TERTIARY PHOSPHINE OXIDES USING HIGH ENERGY RADIATION

[75] Inventors: Hans-Jerg Kleiner, Bad Soden/Taunus; Sigurd Rossinger, Frankfurt am Main, both of Germany

[73] Assignee: Farbwerke Hoechst Aktiengesellshaft vormals Meister Lucius & Bruning, Frankfurt am Main, Germany

[22] Filed: March 4, 1970

[21] Appl. No.: 16,604

[30] Foreign Application Priority Data

March 13, 1969 Germany.....................P 19 12 708.3

[52] U.S. Cl.......................204/162 HE, 204/158 HE
[51] Int. Cl................................................B01j 1/10
[58] Field of Search......204/162 HE, 162 R, 158 HE; 260/606.5 P

[56] References Cited

UNITED STATES PATENTS 2,957,931  10/1960  Hamilton et al................260/606.5 P

*Primary Examiner*—Benjamin R. Padgett
*Attorney*—Curtis, Morris & Safford

[57] ABSTRACT

Improved process for the preparation of tertiary phosphine oxides by reacting dialkyl phosphine oxides with α-olefins, wherein the reaction is carried out in the presence of high-energy radiation. In comparison with known processes the tertiary phosphine oxides are obtained according to the instant process within a shorter reaction time, with higher purity and with higher yields. The reaction products can be used as intermediates, surfactants, detergents and cleaning agents, especially in cosmetic products.

4 Claims, No Drawings

PROCESS FOR THE PREPARATION OF TERTIARY PHOSPHINE OXIDES USING HIGH ENERGY RADIATION

The present invention relates to a process for the preparation of tertiary phosphine oxides.

It is known that secondary dialkyl phosphine oxides having higher alkyl groups or substituted alkyl groups can be added on olefins containing a non-activated carbon-carbon double bond in the presence of radical-forming substances to yield tertiary phosphine oxides (cf. Houben-Weyl "Methoden der Organischen Chemie"XII/1c, (1963), page 153). For example, U.S. Pat. No. 2,957,931 discloses the reaction of dioctyl phosphine oxide with octene-1 in xylene as a solvent at 130°–140°C in the presence of almost molar amounts of di-tertiary-butyl peroxide, calculated on dioctyl phosphine used. After a reaction period of 19 hours a mixture of trioctyl phosphine oxide and dioctylhexadecyl phosphine oxide is obtained. According to J. org. Chem. 26, page 4628 (1961), the reaction of bis-(2-cyanoethyl)-phosphine oxide with octene-(1) in methanol in the presence of 18 mole-% of azo-bisisobutyronitrile as a catalyst provides bis-(2-cyano-ethyl)-octyl phosphine oxide in a yield of 48 percent. Finally, H.R. Hays (cf. J. org. Chem. 33, page 3690 (1968)) succeeded in adding dimethyl phosphine oxide on dodecene-(1) at 70°C during a reaction time of 24 hours. For this purpose, he used dodecene-(1) in a large excess and azo-bisisobutyro-nitrile in an amount of 10 mol-% as catalyst. Dimethyl-dodecyl phosphine oxide was obtained in a yield of 76 percent, calculated on dimethyl phosphine oxide used.

It has now been found that tertiary phosphine oxides of the general formula

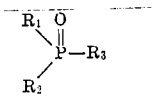

(I)

in which $R_1$ and $R_2$ each represents a methyl or ethyl group and $R_3$ stands for an alkyl group, are obtained in good yield within a shorter reaction time and with higher purity than according to the known process, by reacting dialkyl phosphine oxides of the general formula

(II)

in which $R_1$ and $R_2$ have the meanings given above, with α-olefins at a temperature of from about 40°C to 200°C and with exposure to high-energy radiation.

The reaction is preferably carried out under an atmosphere of an inert gas, especially nitrogen or argon.

It is surprising that the reaction according to the invention can also be carried out at high temperatures of from 130°C to 200°C and thereby yields tertiary phosphine oxides of the formula I with a high purity. For it is known that secondary alkyl phosphine oxides which have a decreasing number of carbon atoms in the alkyl radicals have an increasing tendency to disproportionate into secondary phosphines and phosphinic acids upon heating in an intermolecular redox reaction (cf. Houben-Weyl, "Methoden der Organischen Chemie", XII, 1, (1963), pages 64 and 193; Am. Soc. 77, (1955), page 3412). These findings have also been confirmed by investigations recently carried out by H. R. Hays, J. org. Chem. 33, page 3690 (1968). Hays demonstrated that this tendency to disproportionate exists in the case of dimethyl phosphine oxide used by him. This substance decomposes at 120°C within about 1 hour, at 160° to 170°C within less than 10 minutes.

Therefore, it would have been expected that the high temperatures applied in the process of the invention give rise to a disproportioning of the phosphine oxide, rather than to an addition of the lower dialkyl phosphine oxides on the olefins. It should especially be noted in this connexion that no disproportioning takes place in spite of the action of high-energy radiation according to the invention.

The dialkyl phosphine oxides used as starting material according to the invention may be prepared according to the process disclosed in Belgian Pat. No. 737,594.

The reaction according to the present invention proceeds especially smoothly and provides very high yields when the dialkyl phosphine oxides are used in a very pure form such as obtained according to the above process.

The α-olefins used for the reaction may contain from about 6 to 22 carbon atoms. The α-monoolefins used for the present process may not only be linear but also branched, for example hexene-(1), heptene-(1), octene-(1), dodecene-(1), tridecene-(1), tetradecene-(1), pentadecene-(1), hexadecene-(1), octadecene-(1), heneicosene-(1), docosene-(1), 2-methyl-pentene-(1), 4-methyl-pentene-(1), and 2-ethyl-hexene-(1), as well as mixtures of these olefins.

Especially favorable results are obtained if the α-mono-olefin used is free, or almost free, from sulfur, which means a content of bound sulfur of less than about 0.002 percent.

According to the process of the invention, the olefins advantageously used are freed from sulfur already during the process of their preparation, for example by the so-called Ziegler or Mulheim process wherein ethylene is dimerized or oligomerized in the presence of catalysts, especially triethyl aluminum, to yield straight-chain α-olefins. The same process also permits the preparation of branched α-olefins, for example 2-methyl-pentene-(1) and 2ethyl-hexene-(1), by dimerizing, for example propene or isobutylene (cf. F. Asinger "Chemie und Technologie der Monoolefine" (1957), especially pages 178–180). Dimerization can also be effected in a different way, for example catalytically in the presence of alkali metals. It is, of course, also possible to use α-olefins as starting material that have been obtained by other known methods, for example by cracking mineral oil fractions or waxes, by splitting off hydrogen chloride from paraffins having chlorine atoms in terminal positions, or by dehydrating terminal alcohols. Unless these olefins are free or practically free from sulfur, it is advantageous to eliminate the sulfur completely or almost completely by appropriate measures, for example by catalytical desulfuration.

The reaction is carried out at a temperature of from about 40°C to 200°C, preferably from about 70°C to 150°C.

The reaction time according to the invention is substantially shorter than that of hitherto known methods; for example, for the preparation of 1 mol of tertiary phosphine oxide it ranges from about 1½ hours to about 4 hours, in most cases it is about 2 hours.

The reaction is carried out under the action of high-energy radiation, advantageously using gamma or X-rays. Accelerated electrons having an energy of about 0.5 to 4 MeV or nuclear radiation of a nuclear reactor may also be employed. The dose rate of the radiation may vary within wide limits, namely from $10^3$ rad/h to $10^9$ rad/h. For example, when using gamma rays produced by a cobalt-60 source, the dose rate mostly ranges from $10^3$ rad/h to $10^7$ rad/h. The total radiation dose therefore ranges from about $10^3$ to $10^7$ rad.

Dialkyl phosphine oxide and olefin are suitably used at a molar ratio of about 1 : 1, but it is also possible to use one reaction component in an excess, for example up to 4 times the molar amount.

The reaction may also be carried out in the presence of inert solvents, for example alcohols, esters and hydrocarbons; it is, however, preferable not to use any solvent.

According to the reaction of the invention, the olefin is added dropwise to the dialkyl phosphine oxide. Low-boiling olefins are advantageously added in such a manner that the outlet pipe of the dropping funnel is placed beneath the surface of the dialkyl phosphine oxide. It is also possible to put tertiary phosphine oxide prepared in a first batch into the reaction vessel as dissolving mediator, and simultaneously add the reaction components dropwise. This working method may be suitable for a continuous operation of the process. The reaction mixture obtained thereby is then withdrawn at the same rate as olefin and secondary phosphine oxide are introduced into the reactor. This mixture may subsequently be kept at a determined temperature in another reaction vessel to complete the reaction, and the product obtained is the crude tertiary phosphine oxide.

The product may be worked up, for example by distillation under reduced pressure. Since, according to the process of the invention, no material catalysts are used, the phosphine oxides prepared are free from decomposition products of these catalysts. The tertiary phosphine oxides may, therefore, be obtained with an especially high purity.

The tertiary phosphine oxides obtainable by the process of the present invention are valuable intermediates; especially interesting are tertiary phosphine oxides which contain a long-chained alkyl group and can be prepared by reaction with olefins having at least 8 carbon atoms, owing to their surfactive and bacteriostatic properties. They may be used in detergents and cleaning agents, especially in cosmetic products. The purity of the tertiary phosphine oxides prepared according to the invention is especially high, thus providing them with a special advantage in many application fields.

The following examples serve to illustrate the invention.

EXAMPLE 1

Into a four-necked flask provided with stirrer, reflux condenser, gas inlet pipe and dropping funnel, 70 g of dimethyl phosphine oxide were introduced and, by means of the gas inlet pipe that was not immersed, nitrogen washed with concentrated sulfuric acid was passed through the apparatus first in a rapid current for 90 minutes and then at a reduced rate. The dimethyl phosphine oxide was heated to 90°C. With stirring and radiation from a 10,000 Curie cobalt-60 source at a dose rate of $1.5 \times 10^5$ rad/h, 151 g of dodecene-(1) were added dropwise within 1.5 hours. This corresponded to a total radiation dose of $2.25 \times 10^5$ rad. The temperature was kept constant during this time. The reaction product was then subjected to distillation under a pressure of 0.2 mm mercury. After a first running which contained unreacted dodecene-(1) and dimethyl phosphine oxide that could directly be used again, 166 g of dodecyldimethyl phosphine oxide were obtained which corresponded to a theoretical yield of 75 percent.

When, instead of dimethyl phosphine oxide, the equivalent amount of diethyl phosphine oxide was used, dodecyl-diethyl phosphine oxide was obtained, m.p. 46°–48° C, in practically the same yield.

EXAMPLE 2

In the apparatus described in Example 1, 168 g of dodecene-(1) were added dropwise, while carefully stirring, at 135°C within 2 hours to 78 g of dimethyl phosphine oxide under an atmosphere of nitrogen. The mixture was exposed to the radiation coming from a 10,000 Curie cobalt-60 source at a dose rate of $1.5 \times 10^5$ rad/h, which corresponded to a total radiation dose of $3.0 \times 10^5$ rad. The reaction product was then subjected to distillation under a pressure of 0.2 mm mercury. After a first running, 209 g of dodecyl-dimethyl phosphine oxide were obtained which corresponded to a theoretical yield of 85 percent.

When, instead of dodecene-(1), the equivalent amount of hexene-(1) or hexadecene-(1) was used, hexyldimethyl phosphine oxide, boiling point: 115°C; under a pressure of 0.7 mm mercury, solidification point 46°–46.5°C, or hexadecyl-dimethyl phosphine oxide, m. p. 83°–85°C, was obtained in practically the same yield.

We claim:

1. In the process for preparation of a tertiary phosphine oxide of the formula

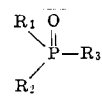

wherein $R_1$ and $R_2$ are methyl or ethyl and $R_3$ is alkyl, by reacting a dialkyl phosphine oxide of the formula

wherein $R_1$ and $R_2$ have the meanings given above with an α-olefin, the improvement which comprises reacting the dialkyl phosphine oxide with an α-olefin of 6 to 22 carbon atoms, with exposure to about $10^3$ rad to about $10^7$ rad of high-energy radiation at a rate of $10^3$ to $10^9$ rad/hr. and at a temperature between 40°C. and 200°C.

2. The process as claimed in claim 1, wherein the reaction is carried out under an atmosphere of an inert gas.

3. The process as claimed in claim 1, wherein the reaction is carried out with a dose rate of about $10^3$ to $10^7$ rad/h.

4. The process as claimed in claim 1, wherein the reaction is carried out with a dose of about $10^4$ to $10^6$ rad.

* * * * *